(12) United States Patent
Maegawa et al.

(10) Patent No.: US 6,338,329 B2
(45) Date of Patent: *Jan. 15, 2002

(54) BLOW-BY GAS PASSAGE ABNORMALITY DETECTING SYSTEM FOR INTERNAL COMBUSTION ENGINES

(75) Inventors: Yoshinori Maegawa, Obu; Masaaki Nakayama, Toyoake, both of (JP)

(73) Assignee: Denso Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/814,046

(22) Filed: Mar. 22, 2001

Related U.S. Application Data

(62) Division of application No. 09/593,818, filed on Jun. 15, 2000, which is a division of application No. 08/988,608, filed on Dec. 11, 1997, now Pat. No. 6,098,603.

(30) Foreign Application Priority Data

Dec. 24, 1996 (JP) .............................................. 8-343013
Dec. 25, 1996 (JP) .............................................. 8-344776

(51) Int. Cl.$^7$ ............................................. F01M 13/00
(52) U.S. Cl. .................. 123/339.15; 123/572
(58) Field of Search ...................... 123/339.15, 572, 123/573, 574

(56) References Cited

U.S. PATENT DOCUMENTS

| 3,754,538 A | 8/1973 | Ephraim et al. |
|---|---|---|
| 3,924,588 A | 12/1975 | Hager |
| 3,951,115 A | 4/1976 | Brisko |
| 4,106,442 A | 8/1978 | Miller |
| 4,516,553 A * | 5/1985 | Lindberg ..................... 123/573 |
| 4,856,487 A | 8/1989 | Furuya |
| 5,205,265 A * | 4/1993 | Kashiyama et al. ......... 123/572 |
| 6,227,184 B1 * | 5/2000 | Katayama et al. .......... 123/572 |

FOREIGN PATENT DOCUMENTS

| JP | U-3-51121 | 5/1991 |
| JP | A-3-172524 | 7/1991 |
| JP | A-4-19312 | 1/1992 |
| JP | 4-19312 | 1/1992 |

* cited by examiner

Primary Examiner—Marguerite McMahon
(74) Attorney, Agent, or Firm—Nixon & Vanderhye PC

(57) ABSTRACT

A blow-by gas passage abnormality detecting system for an internal combustion engine detects, only under the condition that the running state of the engine is idle, a leakage of a blow-by gas coming from a blow-by gas passage for returning the blow-by gas produced in the engine to an intake passage, on the basis of a parameter varying with a change in the air flow to be sucked into the engine. The abnormality such as leakage or clogging in the blow-by gas passage is detected if the ISC opening of an idle speed control valve measured as a load amount at an idle time of the engine is smaller than a predetermined value. Alternatively, the abnormality may be detected by detecting the blow-by gas pressure in the blow-by gas passage downstream of a PCV valve by a gas pressure sensor.

19 Claims, 14 Drawing Sheets

BLOW-BY GAS PASSAGE ABNORMALITY DETECTING SYSTEM FOR INTERNAL COMBUSTION ENGINES

This is a Divisional of Application Ser. No. 09/593,818, filed Jun. 15, 2000, which was a Divisional of Application Ser. No. 08/988,608 filed Dec. 11,1997, now U.S. Pat. No. 6,098,603, the entire contents of each of which is hereby incorporated by reference in this application.

CROSS REFERENCE TO RELATED APPLICATION

This application is related to and incorporates herein by reference Japanese Patent Application No. 8-343013 filed on Dec. 24, 1996 and No. 8-344776 filed on Dec. 25, 1996.

BACKGROUND OF THE INVENTION

1. Field of the Invention

The present invention relates to a blow-by gas passage abnormality detecting system for detecting an abnormality in a blow-by gas passage for recirculating the blow-by gas, as will leak from the combustion chamber of an internal combustion engine to a crankcase, to the intake passage.

2. Related Art

A blow-by gas recirculating system for preventing blow-by gas from being released into the atmosphere is known in which a blow-by gas passage for recirculating the blow-by gas, as will leak from the combustion chamber of an internal combustion engine to the crankcase, to the intake passage is provided.

When an abnormality such as breakage in or detachment of the blow-by gas passage occurs, the blow-by gas may be released, contrary to the desired prevention of environmental pollution.

SUMMARY OF THE INVENTION

Thus, the present invention has an object to provide a blow-by gas passage abnormality detecting system for an internal combustion engine, as can minimize the release of the blow-by gas into the atmosphere and the adverse effect on the internal combustion engine, by detecting an abnormality in the blow-by gas passage properly.

In a blow-by gas passage abnormality detecting system for an internal combustion engine, according to a first aspect of the invention, the abnormality of the blow-by gas passage for returning the blow-by gas in the internal combustion engine to the side of the intake passage is decided on the basis of the amount of load when the running state of the internal combustion engine is idle. By thus grasping the load amount at the idling time of the internal combustion engine, the abnormality of the blow-by gas passage can be properly detected to minimize the release of the blow-by gas into the atmosphere and the adverse effect on the internal combustion engine.

In a blow-by gas passage abnormality detecting system of the internal combustion engine, according to the second aspect of the invention, the abnormality in the blow-by gas passage is decided on the basis of the pressure in the blow-by gas passage. By the simple and inexpensive construction for detecting the pressure in the blow-by gas passage, the abnormality of the blow-by gas passage can be properly detected to minimize the release of the blow-by gas into the atmosphere and the adverse effect on the internal combustion engine.

BRIEF DESCRIPTION OF THE DRAWINGS

Other objects, features and advantages of the present invention will become more apparent from the following detailed description when read with reference to the accompanying drawings. In the drawings.

DETAILED DESCRIPTION OF THE PREFERRED EMBODIMENTS

The invention will be described in detail with reference to its various embodiments.

<Embodiment 1>

Figure 1:
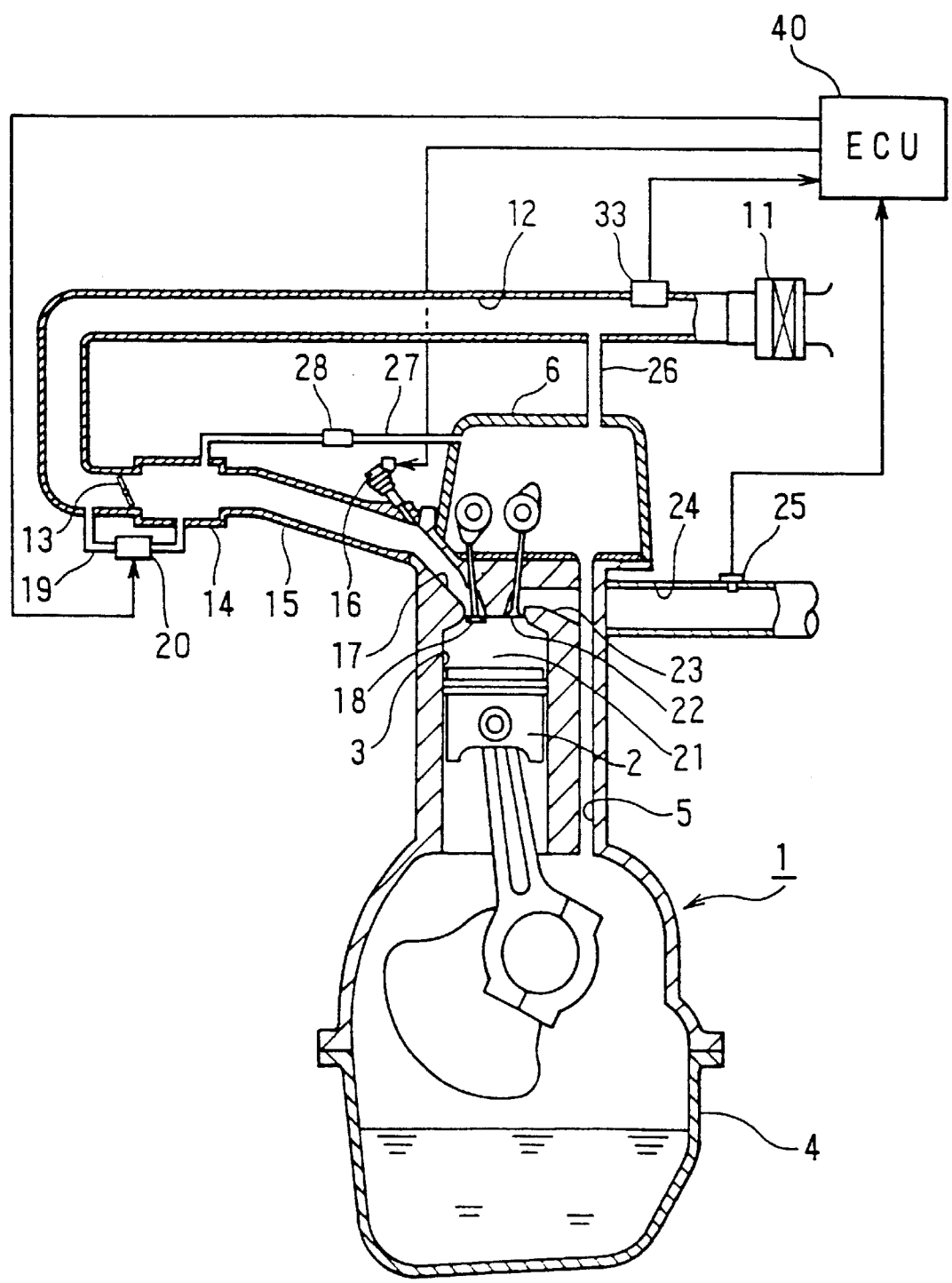
FIG. 1 is a schematic diagram showing the entire construction of a blow-by gas passage abnormality detecting system for an internal combustion engine according to a first embodiment of the invention.

In an intake system of an internal combustion engine 1, as shown in FIG. 1, the air, as introduced from an air cleaner 11 at an upstream side, flows through an air flow meter 33, as arranged in an intake passage 12, a throttle valve 13, as arranged in the intake passage 12, and a surge tank 14 at a downstream side and is mixed with fuel, as injected into an intake manifold 15 by an injector 16, until the mixture is introduced from an intake port 17 through an intake valve 18 into a combustion chamber 21 of each engine cylinder. Midway of a bypass passage 19 connected bypassing the throttle valve 13, on the other hand, there is arranged an ISC (Idle Speed Control) valve 20 for controlling the engine RPM (rotational speed) at an idle time to a predetermined idle RPM. In an exhaust system of the internal combustion engine 1, the exhaust gas from the combustion chamber 21 is discharged from an exhaust valve 22 through an exhaust port 23 and an exhaust passage 24 by the notshown three-way catalytic converter, until it is discharged into the atmosphere. Here, the air flow meter 33 detects the flow amount of intake air passing through the intake passage 12. Upstream of the catalytic converter in the exhaust passage 24, on the other hand, there is arranged an oxygen concentration sensor 25 for detecting the oxygen ($O_2$) concentration in the exhaust gas.

On the other hand, the blow-by gas, as will leak out of the combustion chamber 21 through the clearance between a piston 2 and a cylinder wall 3 into a crankcase 4, is introduced from the upper portion of the crankcase 4 via a communication passage 5 into a head cover 6 of the internal combustion engine 1. The upper portion of the head cover 6 is connected through a communication passage 26 to the intake passage 12 and through a blow-by gas passage 27 to the surge tank 14 downstream of the throttle valve 13. Midway of the blow-by gas passage 27, there is arranged a PCV (Positive Crankcase Ventilation) valve 28 acting as a flow rate control valve having the well-known construction and driven pneumatically by the negative pressure (or the differential pressure).

This PCV valve 28 is so opened/closed by the negative pressure in the surge tank 14 that its air passing area is reduced, when the negative pressure as the intake pressure is high as at the idle time, to reduce the blow-by gas flow from the head cover 6 into the surge tank 14, and that its air passing area is enlarged, when the negative pressure as the intake pressure is enlarged at an acceleration time to increase the blow-by gas flow from the head cover 6 into the surge tank 14.

That is, as the inside of the surge tank 14 takes a negative pressure, the inside of the head cover 6 is ventilated with the fresh air which is introduced out of the intake passage 12 via the communication passage 26, so that the blow-by gas in the head cover 6 is returned, while its flow rate being regulated by the PCV valve 28, via the blow-by gas passage 27 into the surge tank 14.

An ECU (Electronic Control Unit) 40 is constructed as a logical operation circuit including: the not-shown well-known central processing unit CPU; a ROM storing a control program; a RAM for storing various data; a B/U (backup) RAM; an input/output circuit; and bus lines for connecting the foregoing components. To this ECU 40, there are individually inputted a signal on the oxygen concentration in the exhaust passage 24 from the oxygen concentration sensor 25, a signal on the intake air flow to pass through the intake passage 12 from the air flow meter 33, and so on. From the ECU 40, there are individually outputted drive signals to the injector 16 arranged in the intake manifold 15, the ISC valve 20 arranged in the bypass passage 19, and the like.

Figure 2:
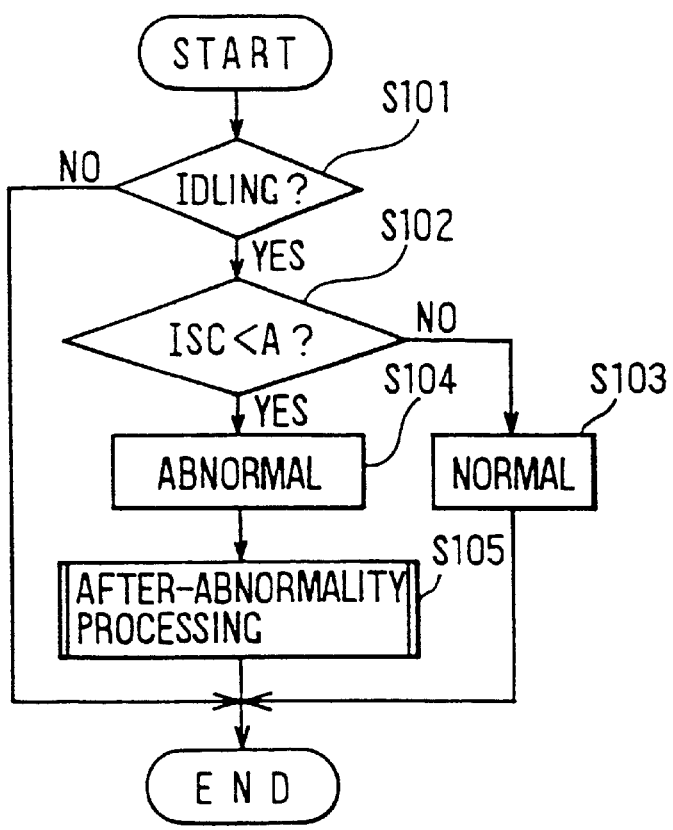
FIG. 2 is a flow chart showing a procedure for processing an abnormality decision in an ECU used in the blow-by gas passage abnormality detecting system according to the first embodiment.

The ECU 40, more particularly the CPU, is programmed to perform processes of FIG. 2 showing a procedure for processing an abnormality decision in the ECU 40 used in the blow-by gas passage abnormality detecting system.

In FIG. 2, at step S101, it is decided whether or not the running state of the internal combustion engine 1 is idle. When the decision of step S101 is NO indication that the running state is other than the idle time, the present routine is ended without any operation. On the other hand, when the decision of step S101 is YES, that is, when the throttle opening of the throttle valve 13 is less than a predetermined value to indicate that the running state is idle, the routine advances to step S102, at which it is decided whether or not the prevailing ISC opening of the ISC valve 20 is less than a decision value or reference A. This decision value A is set to the ISC opening for the idle time, as cannot occur if the blow-by gas passage 27 is normal.

Figure 3:
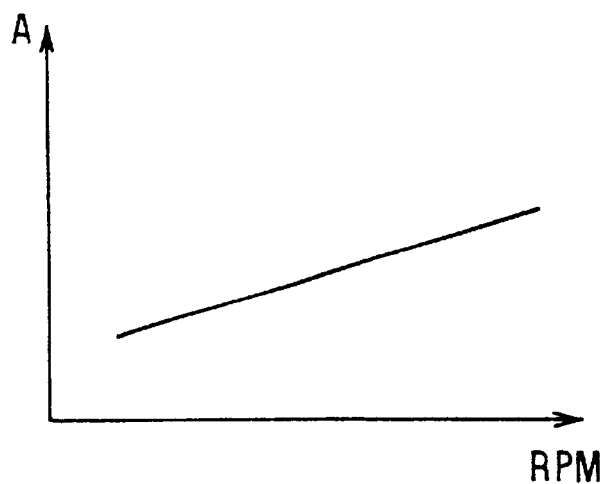
FIG. 3 is a graph showing a change in a decision value used in the routine of FIG. 2 against an engine RPM in the first embodiment.

The setting of this decision value A is based on the fact that the control duty ratio of the ISC valve 20 is ordinarily 20 to 30%, for example, when the blow-by gas passage 27 is normal, whereas an unlikely excess intake supply is made from the side of the blow-by gas passage 27, when this passage 27 causes the leakage or disengagement, so that the control duty ratio of the ISC valve 20 drops as low as 0%. Here, the decision value A may be so set at each engine RPM as to rise according to the rise in the engine RPM, as illustrated by the graph of FIG. 3.

When the decision of step S102 is NO indicating that the ISC opening is no less than the decision value A, the routine advances to step S103, at which it is ended by determining the normality of the blow-by gas passage 27 from the head cover 6 to the surge tank 14. On the other hand, when the decision of step S102 is YES indicating that the ISC opening is less than the decision value A, it is determined that the blow-by gas passage 27 has some leakage or disengagement, the routine advances to step S104, at which an abnormality is determined in the leakage or disengagement of the blow-by gas passage 27 from the head cover 6 to the surge tank 14. Then, the routine advances to step S105, at which it is ended by executing an after-abnormality processing. Thus, it is possible to properly detect the abnormality (i.e., the leakage or the disengagement) of the blow-by gas passage 27 from the head cover 6 to the surge tank 14.

Figure 4:
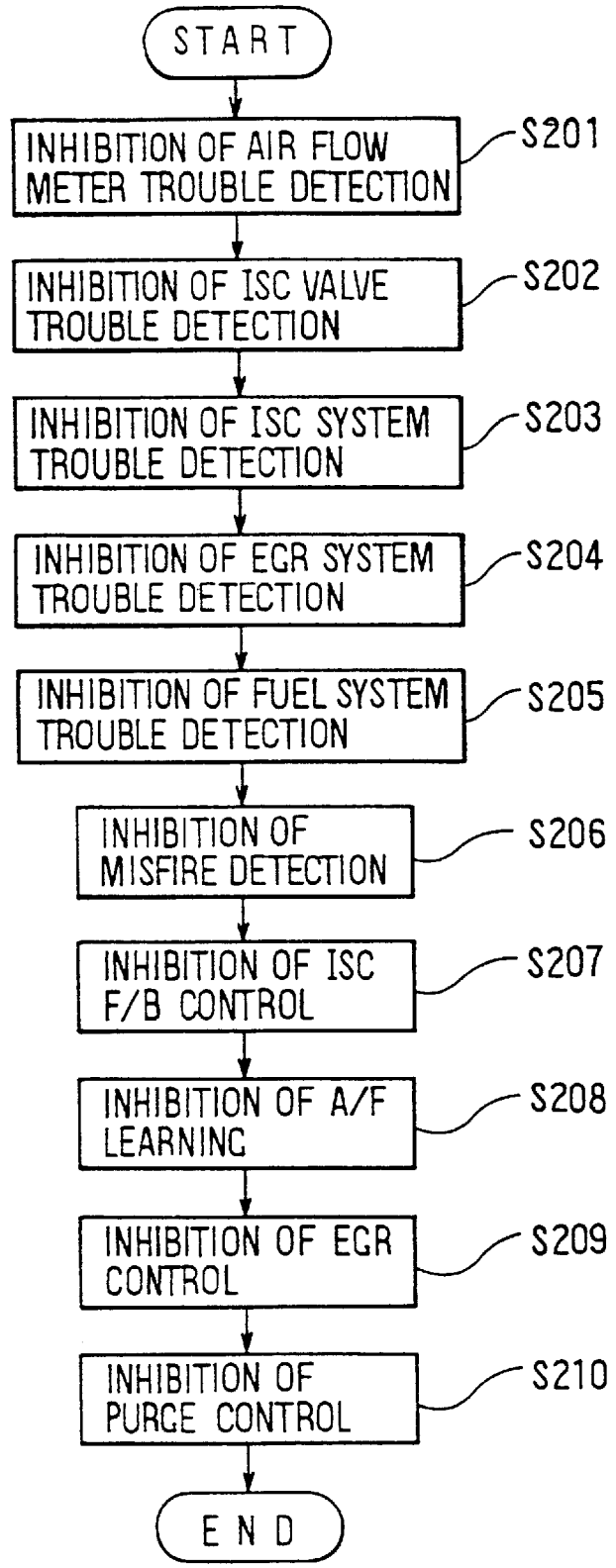
FIG. 4 is a flow chart showing a procedure for processing after an abnormality decision in the ECU used in the blow-by gas passage abnormality detecting system according to the first to third embodiments of the present invention.

Step S105, that is a procedure for processing after an abnormality decision in the ECU 40 used in the blow-by gas passage abnormality detecting system of an internal combustion engine according to first embodiment is shown in FIG. 4. Here, when it is decided that the blow-by gas passage 27 has the abnormality (i.e., the leakage or the disengagement), the reliabilities in the various detection steps and the control steps, as follows, cannot be kept so that these steps are inhibited.

In FIG. 4, at first step S201, the trouble detection of the air flow meter 33 for detecting the intake flow in the intake passage 12 is inhibited; at next step S202, the trouble detection of the ISC valve 20 is inhibited; at next step S203, the trouble detection of the ISC system; at next step S204, the trouble detection of an EGR (Exhaust Gas Recirculation) system (although not shown in FIG. 1) is inhibited; and at next step S205, the trouble detection of the fuel system (such as a fuel injection time control system) is inhibited.

The routine advances to step S206, at which a misfire detection is inhibited; at next step S207, the F/B (i.e., feedback) control of the idle RPM in the ISC system is inhibited (or to lower the gain); at next step S208, an A/F (i.e., air/fuel ratio) learning control is inhibited (or to inhibit the main A/F or to lower the gain); at next step S209, the EGR control is inhibited (or to lower the gain); and at next step S210, the purge control of an evaporated fuel is inhibited (or to lower the gain), and the present routine is ended.

Thus, the blow-by gas passage abnormality detecting system of the present embodiment performs deciding the abnormality of the blow-by gas passage 27 to return the blow-by gas, which is produced in the internal combustion engine 1 on the basis of the load amount when the running state of the internal combustion engine 1 is idle, to the side of the intake passage 12 of the internal combustion engine 1. By taking into consideration the load amount when the running state of the internal combustion engine 1 is idle, therefore, the abnormality of the blow-by gas passage 27 can be properly detected to minimize the release of the blow-by gas into the atmosphere and the adverse effect on the internal combustion engine 1.

Moreover, the blow-by gas passage abnormality detecting system for an internal combustion engine according to the present embodiment is enabled, by the simple and inexpensive construction for measuring the load amount by using the intake flow amount, to minimize the release of the blow-by gas into the atmosphere and the adverse effect on the internal combustion engine 1.

Moreover, the blow-by gas passage abnormality detecting system for an internal combustion engine according to the present embodiment measures the ISC opening as the control amount of the ISC valve 20 for controlling the engine RPM at the idle time of the internal combustion engine 1, by the intake air amount, and decides that the blow-by gas passage 27 has the leakage or disengagement, by the abnormality decision achieved by the ECU 40, when the ISC opening is smaller than the decision value A or the predetermined value. As a result, it can be decided from the more intake flow coming from the others than the ordinary one that the control of the ISC value 20 at the idle time of the internal combustion engine 1, that is, the ISC opening is smaller than the predetermined value, and it can be deemed that the leakage or disengagement occurs in the blow-by gas passage 27. By thus taking into consideration the ISC opening of the ISC valve 20 at the idle time, the abnormality of the blow-by gas passage 27 can be properly detected to minimize the release of the blow-by gas into the atmosphere and the adverse effect on the internal combustion engine 1.

Moreover, the blow-by gas passage abnormality detecting system for an internal combustion engine according to the present embodiment sets the decision value A corresponding to the ISC opening as the control amount for each engine RPM. As a result, the abnormality decision of the blow-by gas passage 27 is accurately made even if the engine RPM is changed by the load fluctuations.

In the present embodiment, moreover, whether or not the abnormality exists is decided at the idle time. If the engine RPM of the internal combustion engine 1 is added to the operational condition so that the decision on whether or not the abnormality exists may be made at an idle time nor more than a predetermined RPM (e.g., 1,000 RPM), an erroneous determination is prevented in a transient state such as at a deceleration to improve the accuracy of the abnormality decision.

<Embodiment 2>

Figure 5:
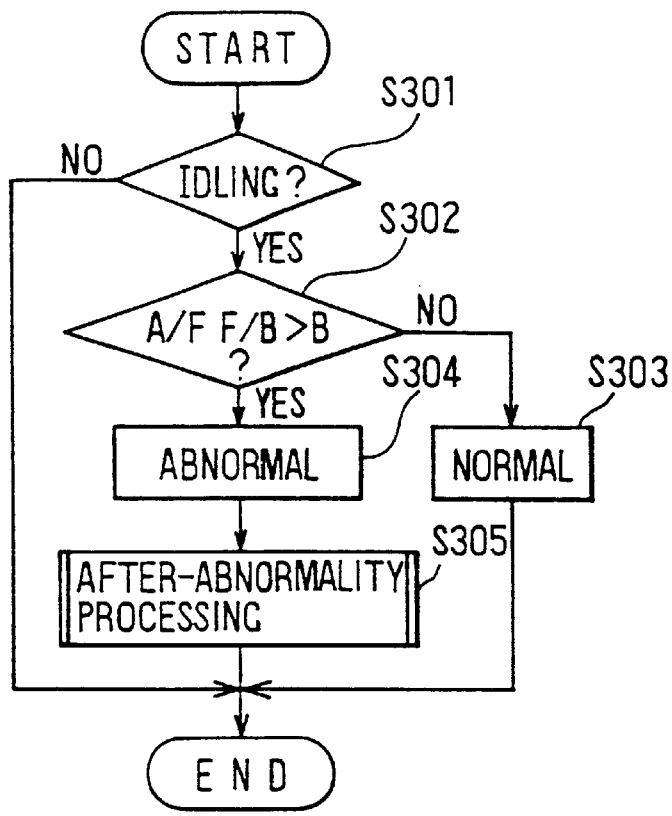
FIG. 5 is a flow chart showing a procedure for processing an abnormality decision in the ECU used in the blow-by gas passage abnormality detecting system according to the second embodiment of the present invention.

In the second embodiment shown in FIG. 5, the entire construction of the blow-by gas passage abnormality detecting system for an internal combustion engine according to the present embodiment is identical to that of the schematic diagram of FIG. 1 in the aforementioned first embodiment.

In FIG. 5, at step S301, it is decided whether or not the running state of the internal combustion engine 1 is idle. When the decision of step S301 is NO indicating that the running state is other than the idle time, the present routine is ended without any operation. On the other hand, when the decision of step S301 is YES, that is, when the throttle opening of the throttle valve 13 is less than a predetermined value to indicate that the running state is idle, the routine advances to step S302, at which it is decided whether or not the prevailing A/F (air/fuel ratio) F/B (feedback) amount on the basis of the output coming from the oxygen concentration sensor 25 are more than a decision value B. This decision value B is set to the A/F F/B amount for the idle time, as cannot occur if the blow-by gas passage 27 is normal.

Figure 6:
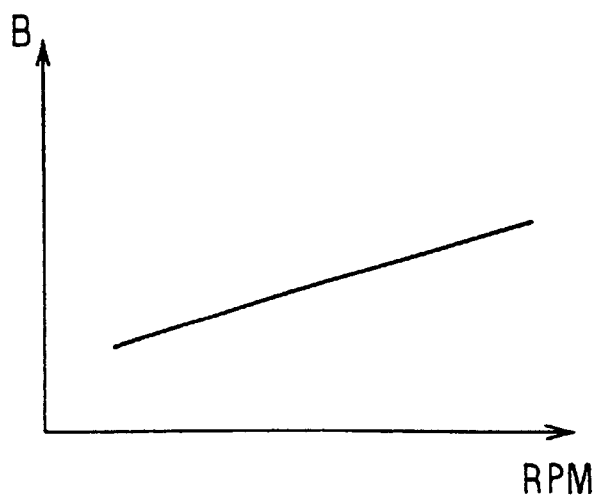
FIG. 6 is a graph showing a change in a decision value used in the routine of FIG. 5 against an engine RPM in the second embodiment.

The setting of this decision value B is based on the fact that the A/F F/B amount is not highly fluctuated, when the blow-by gas passage 27 is normal, whereas an unlikely excess intake supply is made from the side of the blow-by gas passage 27, when this passage 27 causes the leakage or disengagement, so that the A/F F/B amount is highly fluctuated. Here, the decision value B may be so set at each engine RPM as to rise according to the rise in the engine RPM, as illustrated in the graph of FIG. 6. In the abnormality decision of the present embodiment, moreover, the A/F F/B amount is compared with the decision value B, but similar effects can be expected even if either the learned A/F F/B value or the sum of the A/F F/B value and the learned A/F F/B value are compared with the decision value.

When the decision of step S302 is NO indicating that the A/F F/B amount is no more than the decision value B, the routine advances to step S303, at which it is ended by determining the normality in the blow-by gas passage 27 from the head cover 6 to the surge tank 14. On the other hand, when the decision of step S302 is YES indicating that the A/F F/B amount is more than the decision value B, it is deemed that the blow-by gas passage 27 has the leakage or disengagement, the routine advances to step S304, at which an abnormality is determined in the leakage or disengagement of the blow-by gas passage 27 from the head cover 6 to the surge tank 14. Then, the routine advances to step S305, at which it is ended by executing an after-processing of the abnormality decision similar to that of FIG. 4. Thus, it is possible to properly detect the abnormality (i.e., the leakage or the disengagement) of the blow-by gas passage 27 from the head cover 6 to the surge tank 14.

Thus, the blow-by gas passage abnormality detecting system for an internal combustion engine according to the present embodiment measures the A/F F/B amount of the internal combustion engine 1 and decides that the blow-by gas passage 27 has the leakage or disengagement, by the abnormality decision achieved by the ECU 40, when the A/F F/B amount is higher than the decision value B or the predetermined value. As a result, it can be decided from the more intake flow coming from the others than the ordinary one that the A/F F/B amount of the internal combustion engine 1 in the ECU 40 for achieving the abnormality decision is higher than a predetermined value, and it can be deemed that the leakage or disengagement occurs in the blow-by gas passage 27. By thus taking into consideration the A/F F/B amount of the internal combustion engine 1, the abnormality of the blow-by gas passage 27 can be properly detected to minimize the release of the blow-by gas into the atmosphere and the adverse effect on the internal combustion engine 1.

Moreover, the blow-by gas passage abnormality detecting system for an internal combustion engine according to the present embodiment sets the decision value B corresponding to the A/F F/B for each engine RPM. As a result, the abnormality decision of the blow-by gas passage 27 is accurately made even if the engine RPM is changed by the load fluctuations.

<Embodiment 3>

Figure 7:
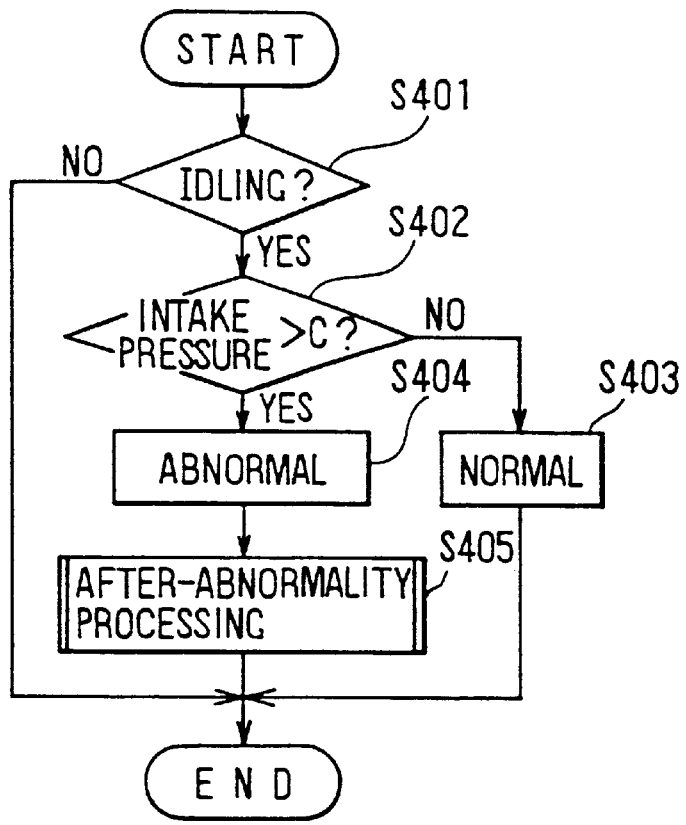
FIG. 7 is a flow chart showing a procedure for processing an abnormality decision in the ECU used in the blow-by gas passage abnormality detecting system according to the third embodiment of the invention.

In the third embodiment shown in FIG. 7, the entire construction of the blow-by gas passage abnormality detecting system for an internal combustion engine according to the present embodiment is modified from the schematic diagram of FIG. 1 of the first embodiment by arranging additionally an intake pressure sensor for detecting the intake pressure in the surge tank leading from the intake passage 12.

In FIG. 7, at step S401, it is decided whether or not the running state of the internal combustion engine 1 is idle. When the decision of step S401 is NO indicating that the running state is other than the idle time, the present routine is ended without any operation. On the other hand, when the decision of step S401 is YES, that is, when the throttle opening of the throttle valve 13 is less than a predetermined value to indicate that the running state is idle, the routine advances to step S402, at which it is decided whether or not the prevailing intake pressure detected by the intake pressure sensor is more than a decision value C. This decision value C is set to the intake pressure for the idle time, as cannot occur if the blow-by gas passage 27 is normal.

Figure 8:
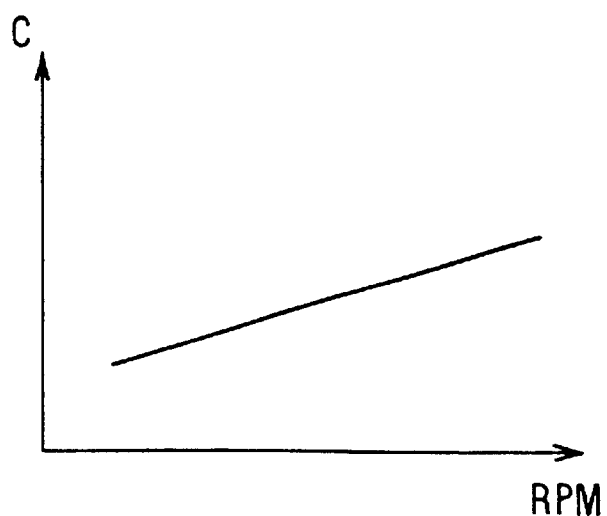
FIG. 8 is a graph showing a change in a decision value of the routine of FIG. 7 against an engine RPM in the third embodiment.

The setting of this decision value C is based on the fact that the intake pressure is within a predetermined negative pressure range, when the blow-by gas passage 27 is normal, whereas a positive pressure near the atmospheric level from the side of the blow-by gas passage 27 is supplied as the suction amount, when this passage 27 causes the leakage or disengagement, so that the intake pressure highly exceeds a predetermined negative pressure range. Here, the decision value C may be so set at each engine RPM as to rise according to the rise in the engine RPM, as illustrated in the graph of FIG. 8.

When the decision of step 402 is NO indicating that the intake pressure is no more than the decision value C, the routine advances to step 403, at which it is ended by determining the normality in the blow-by gas passage 27 from the head cover 6 to the surge tank 14. On the other hand, when the decision of step 402 is YES to indicate that the intake pressure is more than the decision value C, it is deemed that the blow-by gas passage 27 has the leakage or disengagement, the routine advances to step 404, at which an abnormality is determined in the leakage or disengagement of the blow-by gas passage 27 from the head cover 6 to the surge tank 14. Then, the routine advances to step 405, at which it is ended by executing an after-processing of the abnormality decision similar to that of FIG. 4. Thus, it is possible to properly detect the abnormality (i.e., the leakage or the disengagement) of the blow-by gas passage 27 from the head cover 6 to the surge tank 14.

Thus, the blow-by gas passage abnormality detecting system for an internal combustion engine according to the present embodiment decides that the blow-by gas passage 27 causes the leakage or disengagement, by the abnormality decision achieved by the ECU 40, when the load amount represented by the intake pressure detected by the pressure sensor is higher than the decision value C or the predetermined value. By the simple and inexpensive construction for detecting the intake pressure corresponding to the load amount by using the intake pressure sensor, it can be decided that the intake pressure is influenced by a pressure (e.g., the atmospheric pressure) coming from others if it is higher than a predetermined level, and it can be deemed that the leakage or disengagement occurs in the blow-by gas passage 27. By thus taking into consideration the intake pressure corresponding to the load amount of the internal combustion engine 1, the abnormality of the blow-by gas passage 27 can be properly detected to minimize the release of the blow-by gas into the atmosphere and the adverse effect on the internal combustion engine 1.

Moreover, the blow-by gas passage abnormality detecting system for an internal combustion engine according to the present embodiment sets the decision value C corresponding to the intake pressure for each engine RPM. As a result, the abnormality decision of the blow-by gas passage 27 is accurately made even if the engine RPM is changed by the load fluctuations. Moreover, the accuracy of the abnormality decision is further improved by correcting the decision value C with the atmospheric pressure.

Figure 9:
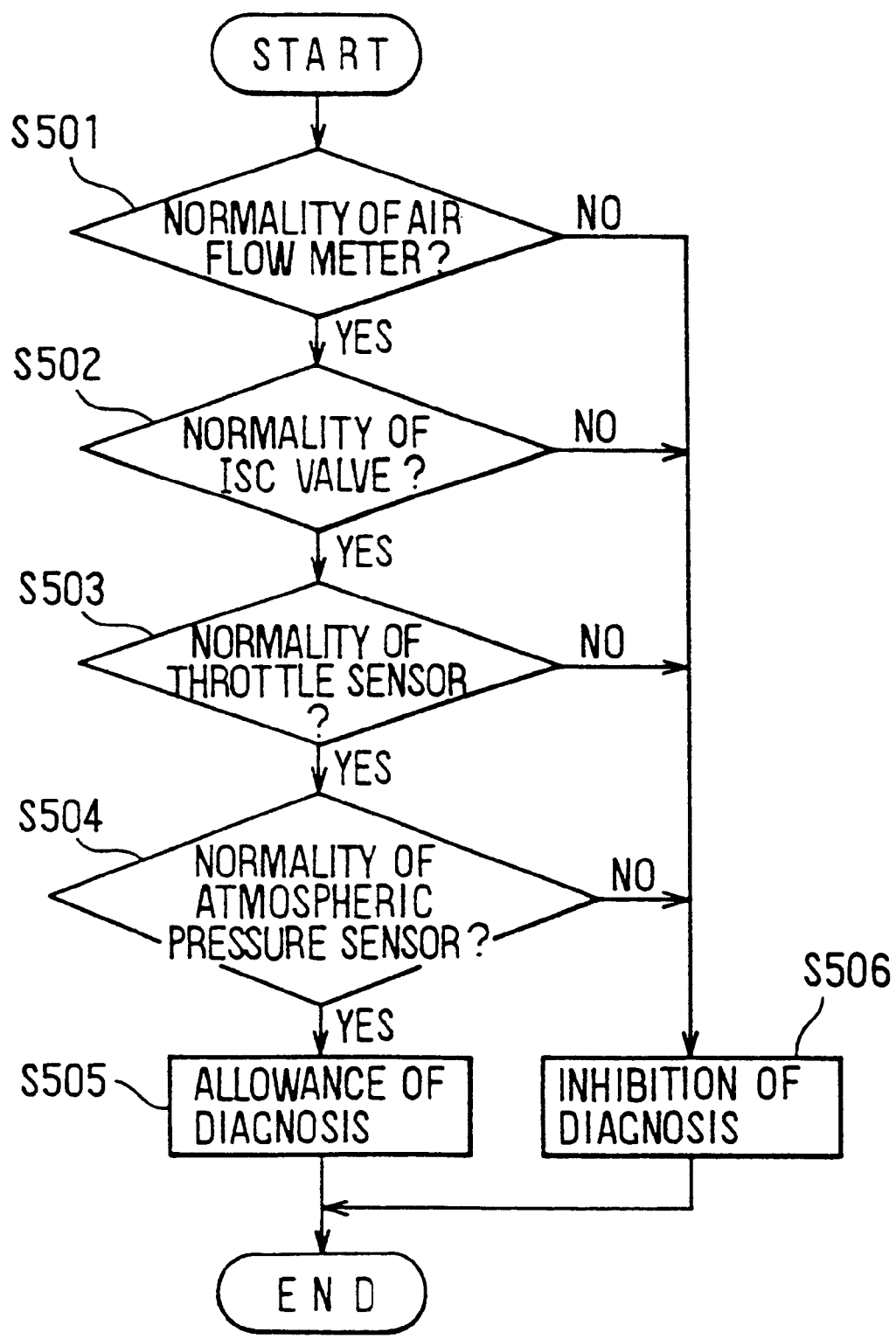
FIG. 9 is a flow chart showing a procedure for deciding the normality/abnormality of an intake line device or the like to be added to the blow-by gas passage abnormality detecting systems of an internal combustion engine according to the first to third embodiments of the invention.

In the above first to third embodiments, before performing the abnormality decision of the blow-by gas passage 27, a normality/abnormality deciding routine of the intake system device or the like can be added, as shown in FIG. 9. Specifically, the decisions of the normality/abnormality are executed on the air flow meter 33 at step S501, on the ISC valve at step S502, on the (not-shown) throttle sensor for detecting the throttle opening of the throttle valve 13 at step S503, on the (not-shown) atmospheric sensor for detecting the atmospheric pressure at step S504. When all these devices are normal, the diagnosis for executing the abnormality decision of the blow-by gas passage 27 is allowed at step S505. When at least one device is abnormal, the diagnosis is inhibited at step S506. Then, the present routine is ended. This makes it possible to decide the abnormality of the blow-by gas passage 27 highly accurately.

Moreover, the foregoing embodiments are constructed by premising the internal combustion engine (i.e., the so-called "L-J engine") in which the fuel injection is controlled by measuring the intake amount of air flow into the intake passage and which is equipped with the air flow meter 33. The application of the invention should not be limited thereto but may employ the intake pressure, as detected in the (not-shown) intake pressure sensor, for the abnormality decision of the blow-by gas passage 27 in the internal combustion engine (i.e., the "D-J engine") in which the fuel injection is controlled by measuring the pressure in the intake passage.

Figure 10A:
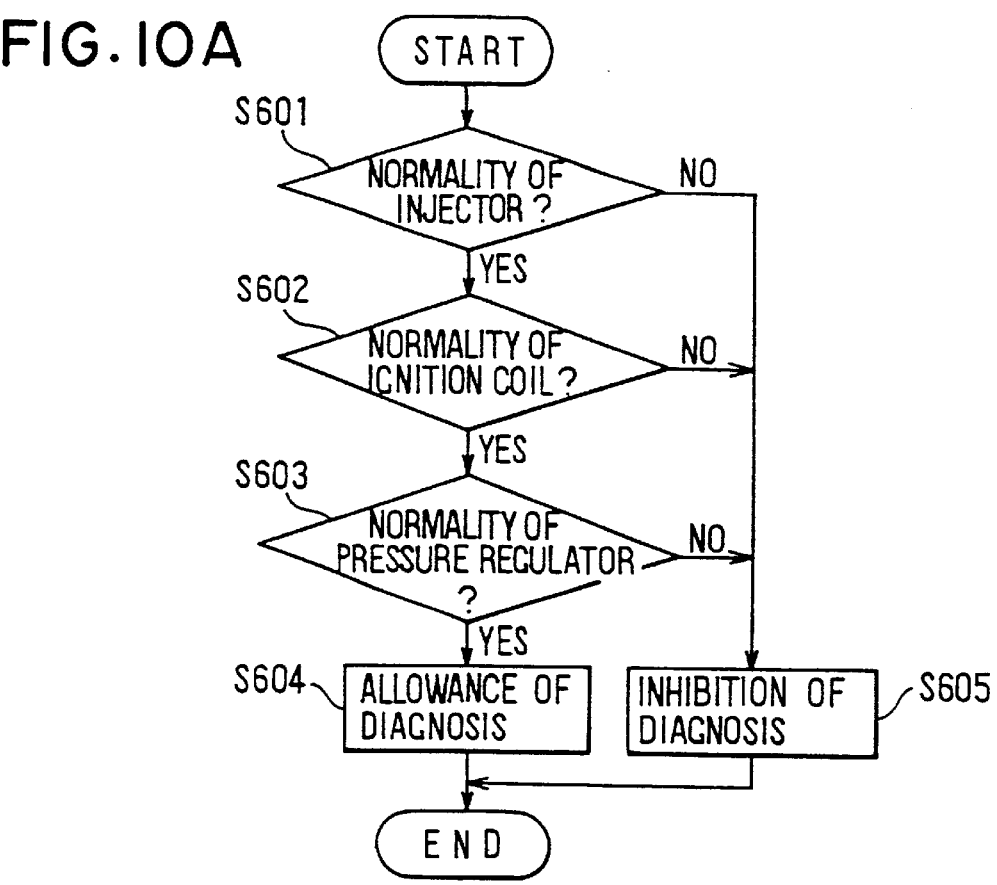
FIG. 10A is a flow chart showing a procedure for deciding the normality/abnormality of a combustion system device to be added to the blow-by gas passage abnormality detecting systems of an internal combustion engine according to the first to third embodiments of the invention.

In the foregoing embodiments, moreover, there can be added a normality/abnormality deciding routine of the combustion system device or the like, as shown in FIG. 10A. The normality/abnormality decisions are executed on the injector 16 at step S601, on an (not-shown) ignition coil at step S602, and on a (not-shown) pressure regulator at step S603. When all these devices are normal, the diagnosis for executing the abnormality decision of the blow-by gas passage 27 is allowed at step S604. When at least one device is abnormal, the diagnosis is inhibited at step S605. Then, the present routine is ended. This makes it possible to improve the abnormality decision of the blow-by gas passage 27.

Figure 10B:
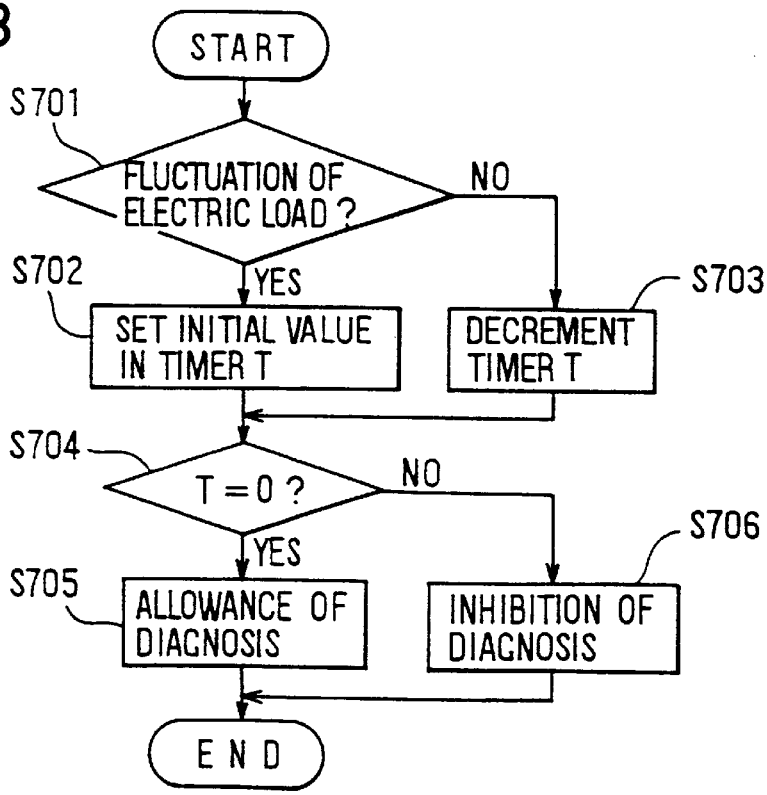
FIG. 10B is a flow chart showing a procedure for allowing/inhibiting diagnoses at an electric load fluctuation to be added to the blow-by gas passage abnormality detecting systems of an internal combustion engine according to the first to third embodiments of the invention.

Further, in the foregoing embodiments, there can be added a diagnosis allowing/inhibiting routine at an electric load fluctuating time, as shown in FIG. 10B. Specifically, when it is decided at step S701 that the electric load is fluctuated from ON to OFF or from OFF to ON, a timer T is set with an initial valve at step S702. When no electric load fluctuation is at step S701, the value of timer T is decremented at step S703. It is decided at step S704 whether or not the timer T is decremented to zero. When the timer value is zero, the diagnosis to execute the abnormality decision of the blow-by gas passage 27 is allowed at step S705. When the timer value is not zero so that a predetermined time has not elapsed from the electric load fluctuation, the diagnosis is inhibited at step S706. Then, the present routine is ended. This makes it possible to improve the abnormality decision of the blow-by gas passage 27.

Moreover, the foregoing embodiments employ the PCV valve 28 which is arranged midway of the blow-by gas passage 27 and acts as the flow rate regulating valve to be driven by the negative pressure. It may be an electromagnetically driven valve, the flow rate of which can be controlled from the side of the ECU 40. In this modification, the decision value in the abnormality decision of the blow-by gas passage 27 may be made variable by the controlled flow rate.

Thus, in the blow-by gas passage abnormality detecting system for an internal combustion engine, the abnormality decision of the blow-by gas passage 27 by the ECU 40 is executed when the various devices of the intake system of the internal combustion engine 1 including the air flow meter 33, the ISC valve 20, the throttle sensor and the atmospheric sensor are normal. As a result, the abnormality of the blow-by gas passage 27 is properly detected.

Moreover, the blow-by gas passage abnormality detecting system for an internal combustion engine executes the abnormality decision of the blow-by gas passage 27 by the ECU 40 when the various devices relating to the combustion of the internal combustion engine 1 including the injector 16, the ignition coil and the pressure regulator are normal. As a result, the abnormality of the blow-by gas passage 27 is properly detected.

<Embodiment 4>

Figure 11:
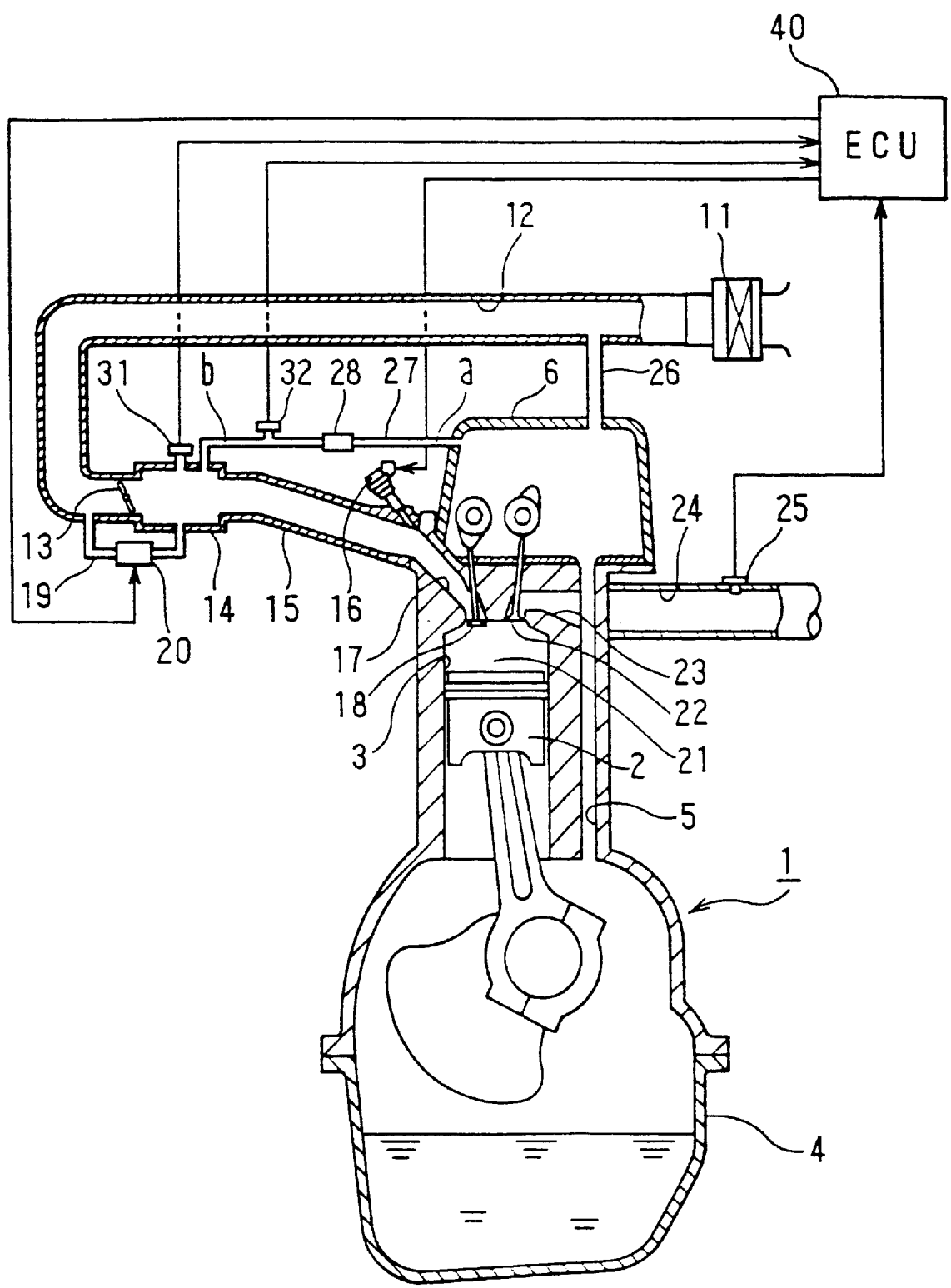
FIG. 11 is a schematic diagram showing the entire construction of a blow-by gas passage abnormality detecting system for an internal combustion engine according to the fourth embodiment of the invention.

In a blow-by gas passage abnormality detecting system for an internal combustion engine according to the fourth embodiment of the invention shown in FIG. 11, in addition to the foregoing embodiments, an intake pressure sensor 31 for detecting the intake pressure in the intake passage 12 downstream of the throttle valve 13 is arranged in the surge tank 14, and a gas pressure sensor 32 for detecting the blow-by gas pressure is arranged in the blow-by gas passage 27 connecting the PCV valve 28 and the surge tank 14. These sensors 31 and 32 are also connected to the ECU 40.

Figure 12:
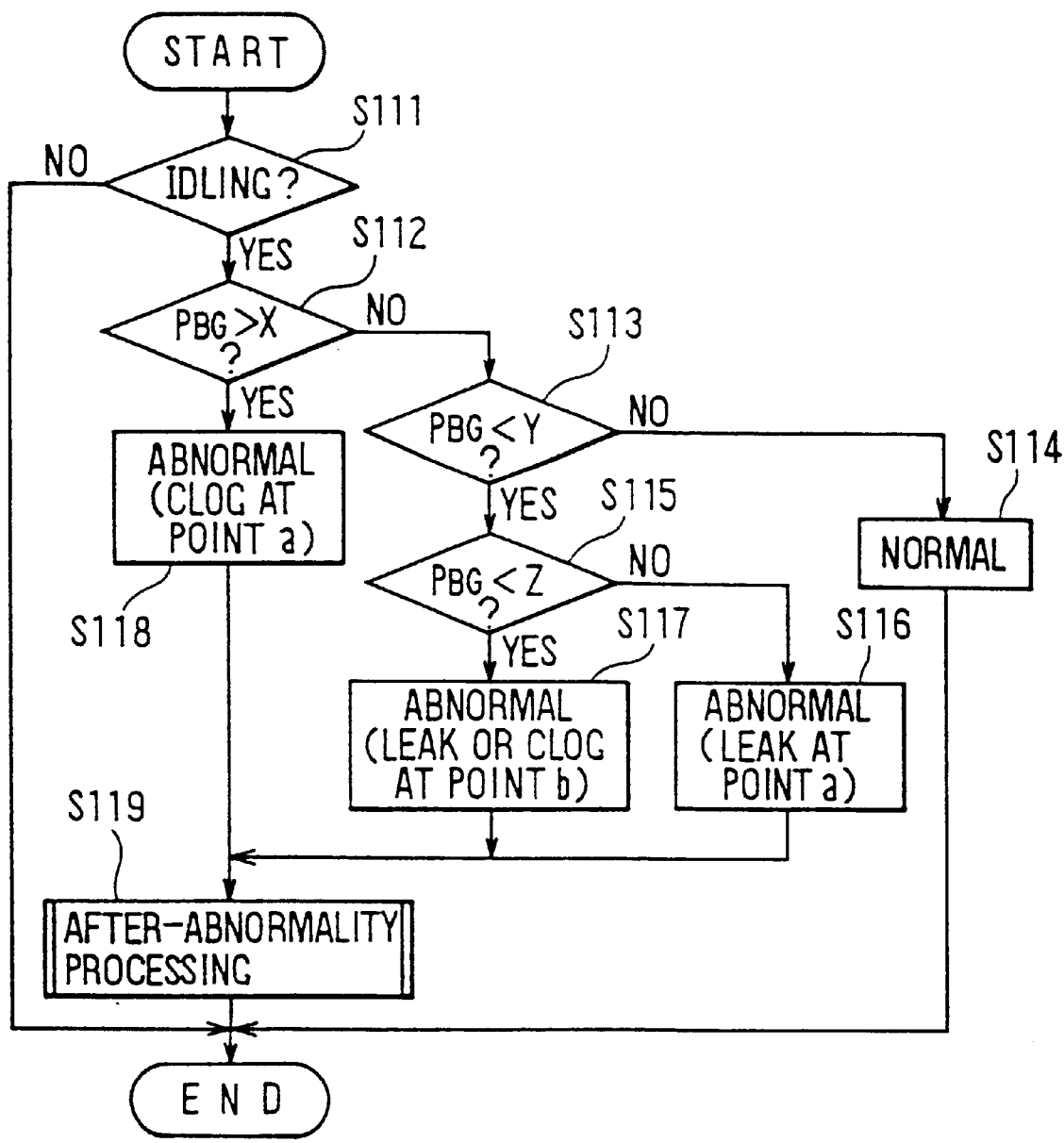
FIG. 12 is a flow chart showing a procedure for processing an abnormality decision in an ECU used in the blow-by gas passage abnormality detecting system according to the fourth embodiment of the invention.
Figure 13:
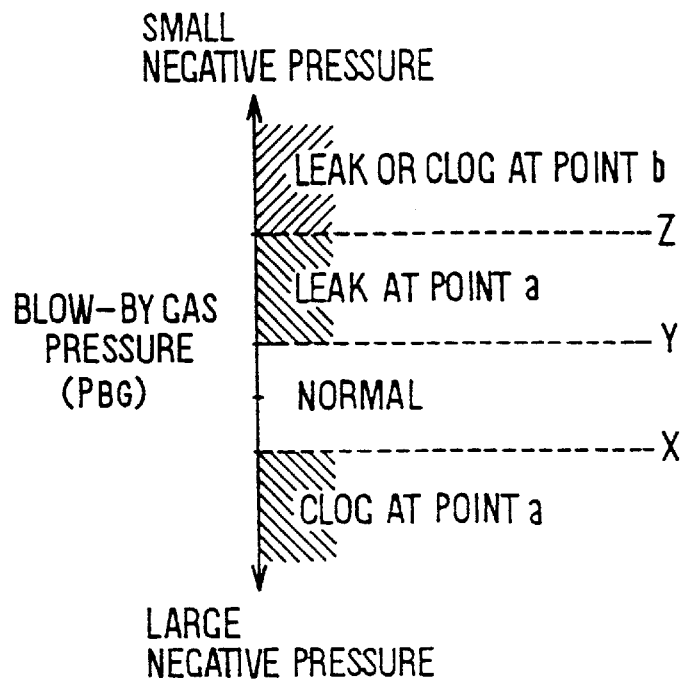
FIG. 13 is an abnormality decision table showing a decision value of a negative pressure against a blow-by gas pressure level of FIG. 12.

The ECU 40 is programmed to perform blow-by gas passage abnormality detecting processing shown in FIG. 12 by the use of an abnormality decision table shown in FIG. 13 which shows decision values X, Y and Z of a negative pressure, as determined in advance by experiments, against a blow-by gas pressure level PBG which is detected by the gas pressure sensor 32 arranged between the PCV valve 28 arranged midway of the blow-by gas passage 27 and the surge tank 14 downstream of the former.

Figure 14:
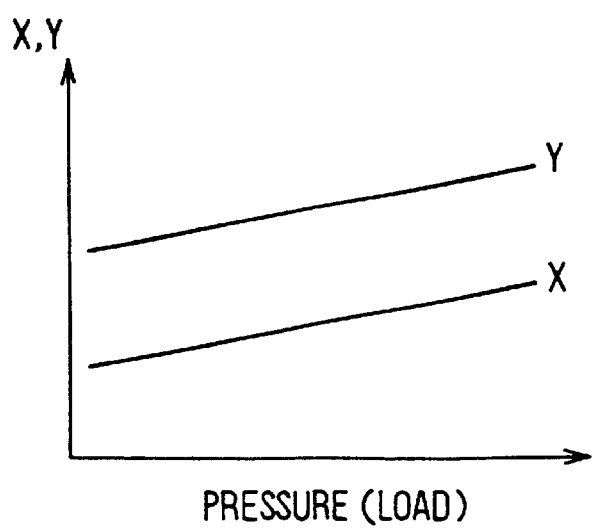
FIG. 14 is a graph showing changes in the decision value of the negative pressure of FIG. 13 against the load fluctuation of the internal combustion engine in the fourth embodiment.

In this embodiment, when the blow-by gas passage 27 shown in FIG. 11 clogs at point a (inlet side of the passage 27), the inside of the blow-by gas passage 27 takes an intake pressure substantially equal to that in the surge tank 14 so that the blow-by gas pressure level PBG by the gas pressure sensor 32 shifts to the side of a larger negative pressure than at the normal time (i.e., to the side of a larger negative pressure than the decision value X). When the blow-by gas passage 27 leaks at point a (as exemplified by the disengagement of the hose of the passage), the blow-by gas pressure level PBG detected by the gas pressure sensor 32 approaches the atmospheric pressure but slightly the side of the negative pressure (at the side where the negative pressure is smaller than the decision value Y but higher than the decision value Z) because of the pressure loss in the midway PCV valve 28. When the blow-by gas passage 27 leaks or clogs at point b, the blow-by gas pressure level PBG by the gas pressure sensor 32 is not influenced by the intake pressure in the surge tank 14 so that it takes a substantially atmospheric pressure (at the side where the negative pressure is smaller than the decision value Z). Here, as the negative pressure of the blow-by gas pressure PBG rises in a manner to correspond to the load fluctuation of the internal combustion engine 1, as shown in the graph of FIG. 14, the decision values x and Y of the negative pressure, as illustrated in FIG. 13, are shifted to the larger side. The parameters of this load fluctuation are exemplified by the engine RPM, the engine coolant temperature, the intake air temperature, the ignition timing and so on of the internal combustion engine 1.

In FIG. 12, it is decided at step S111 whether or not the running state of the internal combustion engine 1 is idle. When the decision of step S111 is NO indicating that the running state is not idle, the present routine is ended without any further operation. On the other hand, when the decision of step S111 is YES indicating that the running state is idle, the routine advances to step S112, at which it is decided whether or not the blow-by gas pressure level PBG from the gas pressure sensor 32 is larger than the negative pressure of the decision value X, as illustrated in FIG. 13. When the decision of step S112 is NO indicating that the blow-by gas pressure level PBG is smaller than the negative pressure of the decision value X, the routine advances to step S113, at which it is decided whether or not the blow-by gas pressure level PBG is smaller than the negative pressure of the decision value Y, as illustrated in FIG. 13. When the decision of step S113 is NO indicating that the blow-by gas pressure level PBG is larger than the negative pressure of the decision value Y, that is, when the blow-by gas pressure level PBG is smaller than the negative pressure of the decision value X and larger than the negative pressure of the decision value Y, the routine advances to step S114, at which a normality of the blow-by gas passage 27 from the head cover 6 to the surge tank 14 is decided to end the present routine.

On the other hand, when the decision of step S113 is YES indicating that the blow-by gas pressure level PBG is at a smaller side than the negative pressure of the decision value Y, the routine advances to step S115, at which it is decided whether or not the blow-by gas pressure level PBG is at a smaller side than the negative pressure of the decision value Z which is set at a smaller side than the negative pressure of the decision value Y, as illustrated in FIG. 13. When the decision of step S115 is NO indicating that the blow-by gas pressure level PBG is at a larger side than the negative pressure of the decision value Z, that is, when the blow-by gas pressure level PBG is smaller than the negative pressure of the decision value Y and larger than the negative pressure of the decision value Z, as illustrated in FIG. 13, the routine advances to step S116, at which an abnormality of leakage at point a (as should be referred to FIG. 11) of the blow-by gas passage 27 between the PCV valve 28 arranged midway of the blow-by gas passage 27 and the head cover 6 upstream of the former is decided.

On the other hand, when the decision of step S115 is YES indicating that the blow-by gas pressure level PBG is at a smaller side than the negative pressure of the decision value Z, the routine advances to step S117, at which an abnormality of clogging or leaking at point b (as should be referred to FIG. 11) of the blow-by gas passage 27 between the PCV valve 28 arranged midway of the blow-by gas passage 27 and the surge tank 14 downstream of the former is decided. On the other hand, when the decision condition of step S112 is YES indicating that the blow-by gas pressure level PBG is at a larger side than the negative pressure of the decision value X, the routine advances to step S118, at which a clogging at point a (as should be referred to FIG. 11) of the blow-by gas passage 27 between the PCV valve 28 arranged midway of the blow-by gas passage 27 and the head cover 6 upstream of the former is decided. When an abnormality is decided at step S116, step S117 or step S118, the routine advances to step S119, at which the after-processing of the abnormality decision is executed, and the present routine is ended. Thus, it is possible to properly detect the abnormal state (e.g., leakage or clogging) at the individual points of the blow-by gas passage 27 from the head cover 6 to the surge tank 14.

Figure 15:
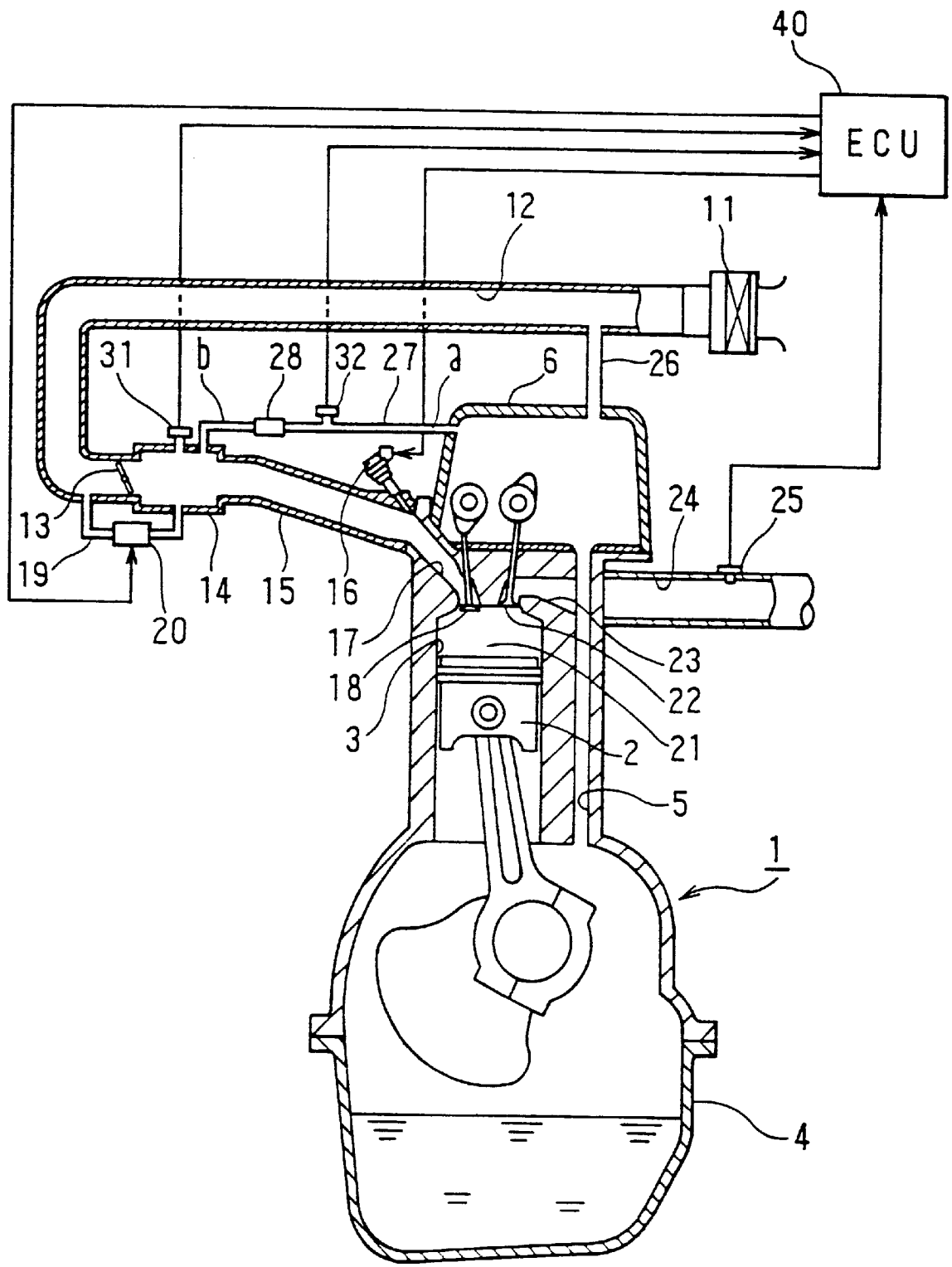
FIG. 15 is a schematic diagram showing a modification of an arrangement construction of a gas pressure sensor, as used in the blow-by gas passage abnormality detecting system of an internal combustion engine according to the fourth embodiment of the invention, with respect to a blow-by gas passage.

In this embodiment, as shown in FIG. 11, the gas pressure sensor 32 for detecting the negative pressure in the blow-by gas passage 27 is arranged between the PCV valve 28 and the surge tank 14 downstream of the former. As modified in FIG. 15, however, the gas pressure sensor 32 can be arranged between the PCV valve 28 and the head cover 6 upstream of the former. In this modification, too, the decision of normality/abnormality may be made in the similar manner as in the fourth embodiment, based upon the negative pressure state detected by the gas pressure sensor 32.

Figure 16:
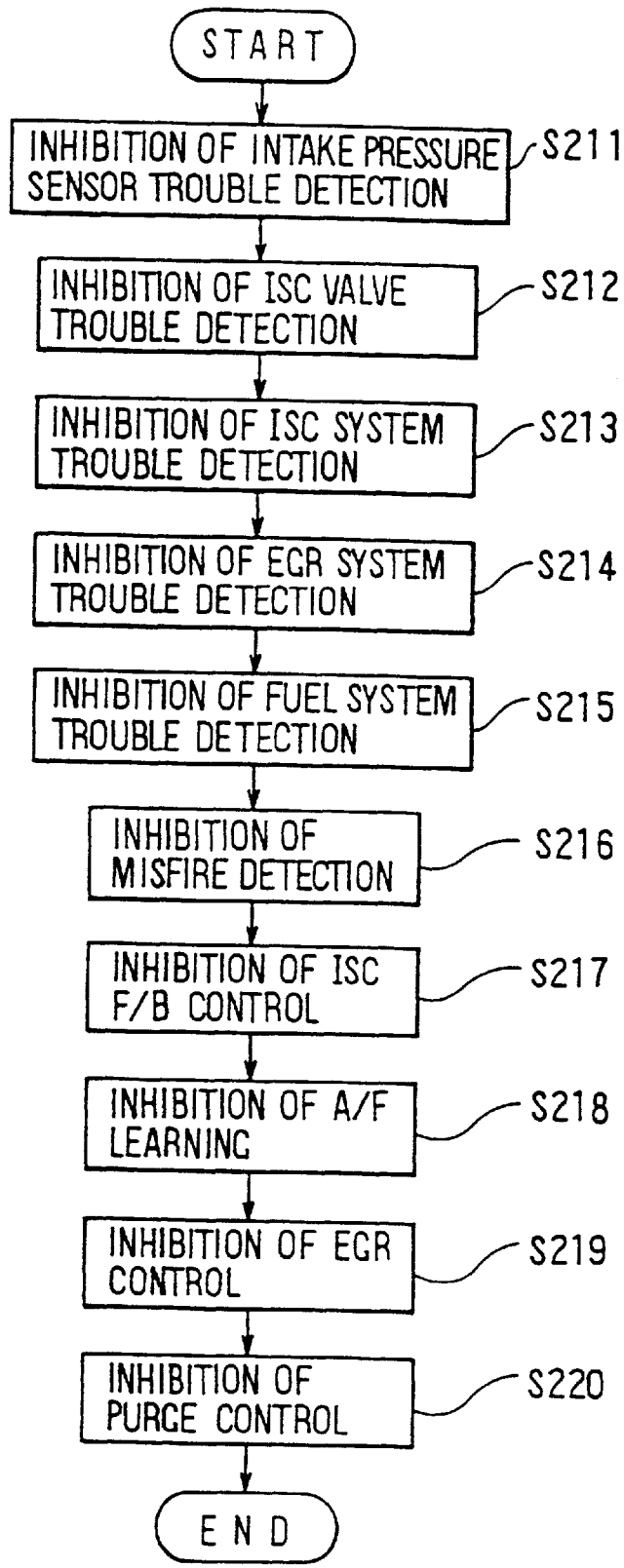
FIG. 16 is a flow chart showing a processing procedure after an abnormality decision in an ECU used in the blow-by gas passage abnormality detecting system according to the fourth embodiment of the invention.

The processing procedure after the abnormality decision of step S119 of FIG. 12 in the ECU 40 is shown in FIG. 16 which is similar to the after-abnormality processing of the first to third embodiments shown in FIG. 4. Once it is decided that an abnormality (e.g., leakage or clogging) occurs in the blow-by gas passage 27, the following various detections and controls are inhibited because the reliabilities will not be maintained.

At first step S211, there is inhibited the trouble detection of the intake pressure sensor 31 for detecting the intake pressure in the surge tank 14 downstream in the intake passage 12 downstream of the throttle valve 13. At next step S212, the trouble detection of the ISC valve 20 is inhibited. At next step S213, the trouble detection of the ISC system is inhibited. At next step S214, the trouble detection of the EGR is inhibited. At next step S215, the trouble detection of the fuel line (for controlling the fuel injection time or the like) system is inhibited. Next, the routine advances to step S216, at which the misfire detection is inhibited. At next step S217, the F/B (feedback) control of the idle RPM in the ISC system is inhibited (or to lower its control gain). At next step S218, the A/F (air/fuel ratio) learning control is inhibited. At nest step S219, the EGR control is inhibited (or to lower its control gain). At next step S220, the control of the purge of the evaporated fuel is inhibited (or to lower its control gain). Then, the present routine is ended.

Thus, in the blow-by gas passage abnormality detecting system for an internal combustion engine of the fourth embodiment, the abnormality of the blow-by gas passage 27 is decided by the gas pressure sensor 32 for detecting the blow-by gas pressure level PBG in the blow-by gas passage 27 to return the blow-by gas produced in the internal combustion engine 1 to the side of the intake passage 12 of the internal combustion engine 1 and by the ECU 40 on the basis of the blow-by gas pressure level PBG detected by the gas pressure sensor 32. By the simple and inexpensive construction for detecting the blow-by gas pressure level PBG in the blow-by gas passage 27, therefore, the abnormality of the blow-by gas passage 27 is properly detected. This makes it possible to minimize the release of the blow-by gas into the atmosphere and the adverse effect on the internal combustion engine 1.

<Embodiment 5>

In the fifth embodiment also, the intake pressure sensor 31 is arranged in the surge tank 14 in addition to the gas pressure sensor 32 as used in the fourth embodiment and arranged midway of the blow-by gas passage 27, so that a negative pressure difference ΔP or the difference between the intake pressure level from the intake pressure sensor 31 and the blow-by gas pressure level from the gas pressure sensor 32 is used for detecting the blow-by gas passage abnormality.

Figure 17:
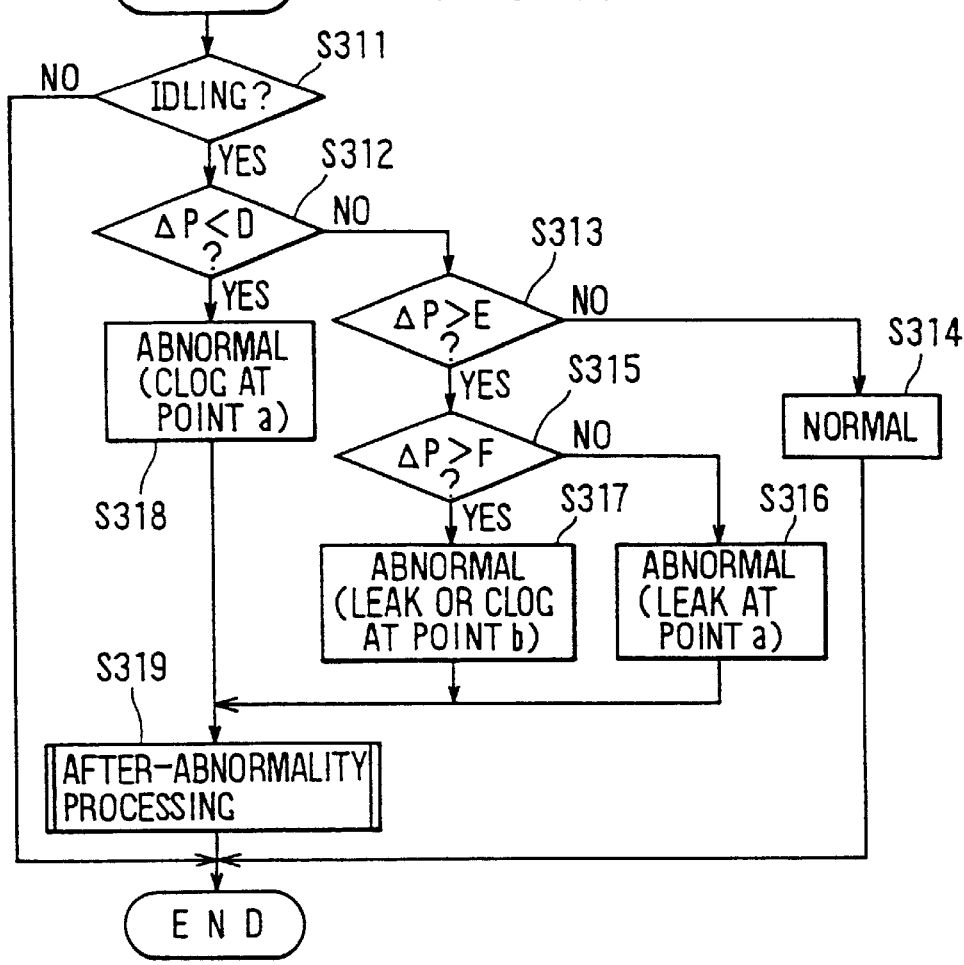
FIG. 17 is a flow chart showing a procedure for processing an abnormality decision in an ECU used in the blow-by gas passage abnormality detecting system according to the fifth embodiment of the invention.
Figure 18:
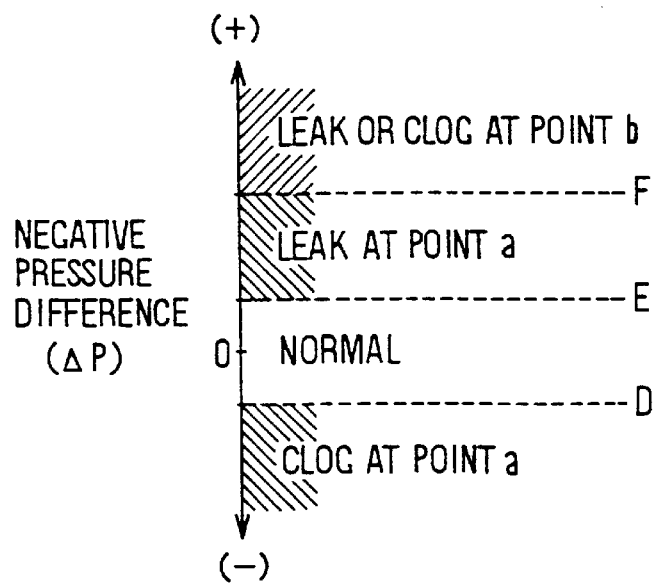
FIG. 18 is an abnormality decision table showing a decision value against the negative pressure difference of FIG. 17 in the fifth embodiment.

This detection processing is shown in FIG. 17 and uses an abnormality decision table of decision values D, E and F shown in FIG. 18. Those values are determined in advance from experiments or the like and correspond to the negative pressure difference ΔP between the intake pressure level from the intake pressure sensor 31 and the blow-by gas pressure level from the gas pressure sensor 32.

In this embodiment, similarly to the fourth embodiment (FIG. 11), when the blow-by gas passage 27 clogs at point a, the inside of the blow-by gas passage 27 approaches the intake pressure in the surge tank 14 so that the negative pressure difference ΔP between the intake pressure level by the intake pressure sensor 31 and the blow-by gas pressure level by the gas pressure sensor 32 shifts to the negative (−) side (i.e., to the negative side from the decision value D) from the normal one. On the other hand, when the blow-by gas passage 27 leaks (to cause an disengagement of the passage, for example) at point a, the inside of the blow-by gas passage 27 approaches the atmospheric pressure so that the negative pressure difference ΔP shifts to the positive (+) side (i.e., closer to the positive side than the decision value E and to the negative side than the decision value F) from the normal one because of the pressure loss in the midway PCV valve 28. Moreover, when the blow-by gas passage 27 leaks or clogs at point b, the blow-by gas pressure level by the gas pressure sensor 32 takes a substantially atmospheric level without being influenced by the intake pressure level in the surge tank 14, so that the negative pressure difference ΔP between the intake pressure level by the intake pressure sensor 31 and the blow-by gas pressure level by the gas pressure sensor 32 highly shifts to the positive side (i.e., closer to the positive side than the decision value F).

In FIG. 17, it is decided at step S311 whether or not the running state of the internal combustion engine 1 is idle. When the decision of step S311 is NO indicating that the running condition is not idle, the present routine is ended without any operation. On the other hand, when the decision of step S311 is YES indicating that the running state is idle, the routine advances to step S312, at which it is decided whether or not the negative pressure difference ΔP or the difference between the intake pressure level from the intake pressure sensor 31 and the blow-by gas pressure level from the gas pressure sensor 32 is less than the decision value D and highly at the negative side. When the decision of step S312 is NO indicating the negative pressure difference ΔP is at the positive side no less than the decision value D, the routine advances to step S313, at which it is decided whether or not the negative pressure difference ΔP is over the decision value E and at the positive side, as illustrated in FIG. 18. When the decision of step S313 is NO indicating that the negative pressure difference ΔP is no more than the decision value E, that is, when the negative pressure difference ΔP is no less than the decision value D and no more than the decision value E, as illustrated in FIG. 18, the routine advances to step S314, at which the normality of the blow-by gas passage 27 from the head cover 6 to the surge tank 14 is decided to end the present routine.

On the other hand, when the decision of step S313 is YES indicating that the negative pressure difference ΔP is over the decision value E and at the positive side, the routine advances to step S315, at which it is decided whether or not the negative pressure difference ΔP is over and highly at the positive side of the decision value F set at the positive side of the decision value E, as illustrated in FIG. 18. When the decision of step S315 is NO indicating that the negative pressure difference ΔP is below the decision value F and at the negative side, when the negative pressure difference ΔP is over the decision value E and no more than the decision value F, as illustrated in FIG. 18, the routine advances to step S316, at which the abnormality (leakage) at point a of the blow-by gas passage 27 between the PCV valve 28 arranged midway of the blow-by gas passage 27 and the head cover 6 upstream of the former is decided.

On the other hand, when the decision of step S315 is YES indicating that the negative pressure difference ΔP is over the decision value F and at the positive side, the routine advances to step S317, at which an abnormality (leakage or clogging) at point b of the blow-by gas passage 27 between the PCV valve 28 arranged midway of the blow-by gas passage 27 and the surge tank 14 downstream of the former is decided. On the other hand, when the decision of step S312 is YES indicating that the negative pressure difference ΔP is at the negative side no less than the decision value D, the routine advances to step S318, at which an abnormality (clogging) at point a of the blow-by gas passage 27 between the PCV valve 28 arranged midway of the blow-by gas passage 27 and the head cover 6 upstream of the former is decide. When the abnormality is decided at step S316, at step S317 or at step S318, the routine advances to step S319, at which the after-processing of the abnormality decision similar to that shown in FIG. 16 is executed to end the present routine. Thus, it is possible to properly detect the abnormal state (leakage or clogging) at each point of the blow-by gas passage 27 from the head cover 6 to the surge tank 14.

Thus in the blow-by gas passage abnormality detecting system for an internal combustion engine according to the fifth embodiment, an abnormality of the blow-by gas passage 27 is decided in the ECU 40 by the gas pressure sensor 32 for detecting the pressure in the blow-by gas passage 27 between the PCV valve 28 acting as the flow rate control valve for controlling the flow rate to pass through the blow-by gas passage 27 to return the blow-by gas produced in the internal combustion engine 1 to the side of the intake passage 12 of the internal combustion engine 1 and the side of the intake passage 12 downstream of the PCV valve 28, and by the intake pressure sensor 31 for detecting the pressure in the intake passage 12, such that the differential pressure ΔP between the pressure detected by the gas pressure sensor 32 and the pressure detected by the intake pressure sensor 31 is compared with the decision values D, E and F at the predetermined values. By the simple and inexpensive construction for detecting the differential pressure ΔP between the pressure in the blow-by gas passage 27 downstream of the PCV valve 28 and the pressure in the intake passage 12, therefore, an abnormality (leakage or clogging) of the blow-by gas passage 27 upstream or downstream of the PCV valve 28 can be properly detected in view of the differential pressure ΔP over the decision values D, E and F thereby to minimize the release of the blow-by gas into the atmosphere and the adverse effect on the internal combustion engine 1. Here, the abnormality of the blow-by gas passage 27 can likewise be decided, too, by arranging the gas pressure sensor 32 between the upstream of the PCV valve 28 and the side of the internal combustion engine 1 and by detecting the pressure in the blow-by gas passage 27 inbetween.

In the fourth and fifth embodiments, the abnormality decision of the blow-by gas passage 27 is executed only at the idle time. However, it should not be limited thereto, but a similar detection can be executed in operations other than the idle time if the decision values are set to correspond to the running state.

Figure 19:
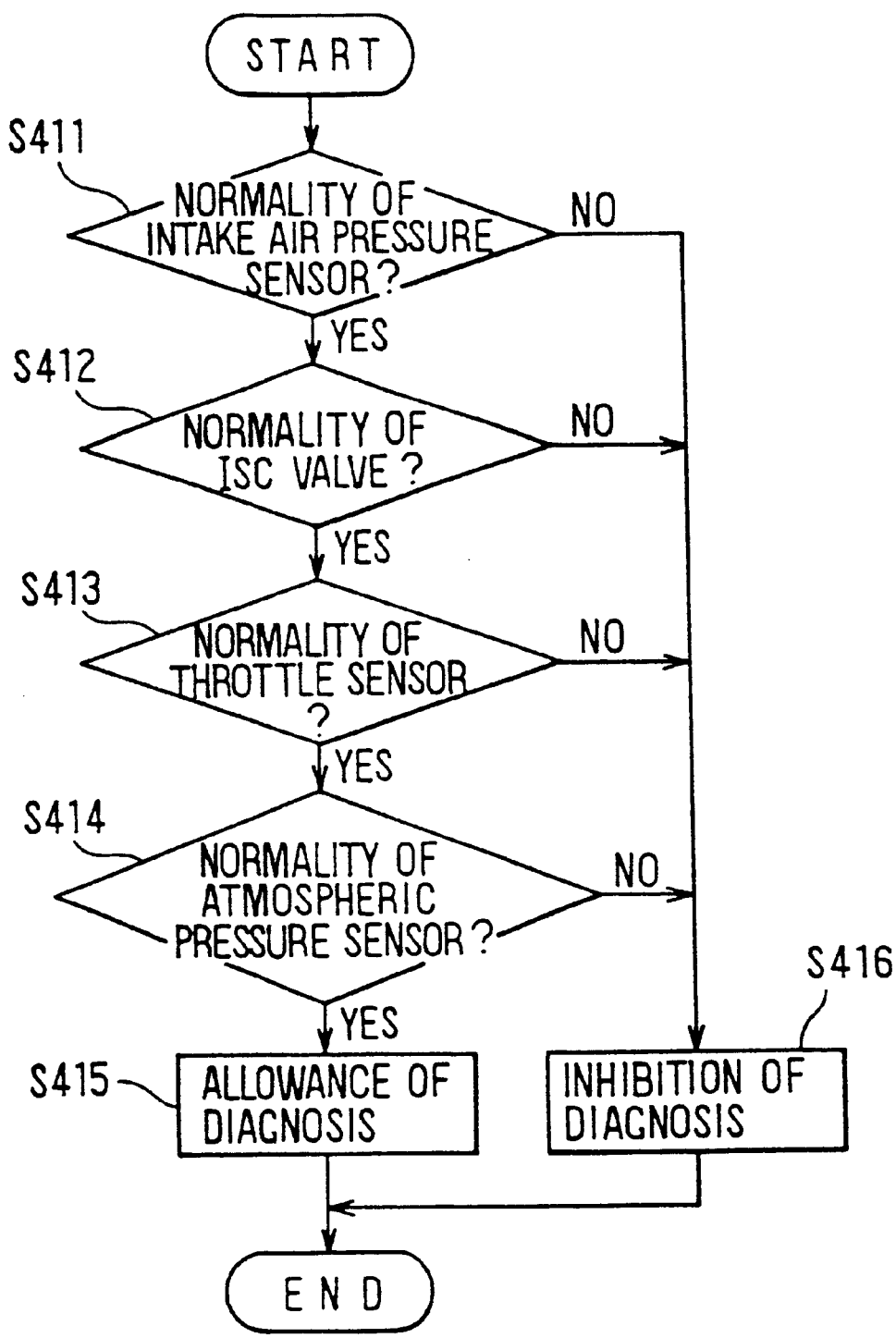
FIG. 19 is a flow chart showing a procedure for deciding the normality/abnormality of an intake line device or the like to be added to the blow-by gas passage abnormality detecting systems of an internal combustion engine according to the fourth and fifth embodiments of the invention.

Before the abnormality decision of the blow-by gas passage 27 in the fourth and fifth embodiments, moreover, there can be added a normality/abnormality deciding routine of the intake system device and so on, as shown in FIG. 19. The normality/abnormality decisions are executed in the intake pressure sensor 31 at step S411, in the ISC valve 20 at step S412, in the throttle sensor for detecting the throttle opening 10 of the throttle valve 13 at step S413, and in the atmospheric sensor for detecting the atmospheric pressure at step S414. When all the devices are normal, the diagnosis for executing the abnormality decision of the blow-by gas passage 27 is allowed at step S415. When any of the devices is abnormal, the diagnosis is inhibited at step S416. Then, the present routine is ended. This makes it possible to perform the abnormality decision of the blow-by gas passage 27 highly accurately.

Moreover, the fourth and fifth embodiments are constructed by premising the internal combustion engine (i.e., the so-called "D-J engine") in which the fuel injection is controlled by measuring the pressure into the intake passage and which is equipped with the intake pressure sensor 31. It may employ the intake flow, as detected by an air flow meter and converted into the intake pressure at that time, for the abnormality decision of the blow-by gas passage 27 in the internal combustion engine (i.e., the "L-J engine") in which the fuel injection is controlled by measuring the intake flow into the intake passage.

Moreover, there can be added to the fourth and fifth embodiments a normality/abnormality deciding routine of the combustion system device or the like, as shown in FIGS. 10A and 10B.

The present invention having been described with reference to the first to fifth embodiments may be modified or altered further without departing from the spirit and scope of the invention.

What is claimed is:

1. A blow-by gas passage abnormality detecting system comprising:
   a flow control valve for controlling a flow to pass through a blow-by gas passage to return a blow-by gas produced by an internal combustion engine to an intake passage of said internal combustion engine;
   downstream pressure detecting means arranged in said blow-by gas passage for detecting a pressure downstream of said flow control valve; and
   abnormality deciding means for deciding that an abnormality occurs in said blow-by gas passage when the pressure detected by said downstream pressure detecting means is lower than a first predetermined level.

2. A blow-by gas passage abnormality detecting system according to claim 1,
   wherein said abnormality deciding means includes means for deciding that an abnormality occurs in said blow-by gas passage, when the pressure detected by said downstream pressure detecting means is higher than a second predetermined level higher than said first predetermined level.

3. A blow-by gas passage abnormality detecting system according to claim 2,
   wherein said first and second predetermined levels are set with reference to the pressure detected by said pressure detecting means, when said blow-by gas passage is normal.

4. A blow-by gas passage abnormality detecting system according to claim 1,
   wherein said abnormality deciding means executes an abnormality decision when various devices of at least one of an engine intake system and combustion system of said internal combustion engine are normal.

5. A blow-by gas passage abnormality detecting system according to claim 1,
   wherein said abnormality deciding means executes an abnormality decision when a running state of said internal combustion engine is stable.

6. A blow-by gas passage abnormality detecting system according to claim 1, further comprising:
   inhibition means for inhibiting trouble detections of various devices of at least one of an engine intake system and combustion system of said internal combustion engine when it is decided by said abnormality decision means that an abnormality occurs in said blow-by gas passage.

7. A blow-by gas passage abnormality detecting system according to claim 1, further comprising:
   inhibition means for inhibiting detection of troubles in a control system of said internal combustion engine when it is decided by said abnormality decision means that an abnormality occurs in said blow-by gas passage.

8. A blow-by gas passage abnormality detecting system according to claim 1, further comprising:
   control inhibition means for inhibiting a portion of controls of said internal combustion engine when it is decided by said abnormality decision means that an abnormality occurs in said blow-by gas passage.

9. A blow-by gas passage abnormality detecting system according to claim 8,
   wherein said control inhibition means includes means for inhibiting an exhaust gas recirculation control to recirculate exhaust gas of said internal combustion engine to said intake passage.

10. A blow-by gas passage abnormality detecting system according to claim 8,
    wherein said control inhibition means includes means for inhibiting a purge control to purge an evaporated gas produced in a fuel tank to said intake passage.

11. A blow-by gas passage abnormality detecting system comprising:
    a flow control valve for controlling a flow to pass through a blow-by gas passage to return blow-by gas produced by an internal combustion engine to an intake passage of said internal combustion engine;
    upstream pressure detecting means arranged in said blow-by gas passage for detecting a pressure upstream of said flow control valve; and
    abnormality deciding means for deciding that an abnormality occurs in said blow-by gas passage when the pressure detected by said upstream pressure detecting means is lower than a first predetermined level.

12. A blow-by gas passage abnormality detecting system according to claim 11,
    wherein said abnormality deciding means includes means for deciding that the abnormality occurs in said blow-by gas passage, when the pressure detected by said upstream pressure detecting means is higher than a second predetermined level higher than said first predetermined level.

13. A blow-by gas passage abnormality detecting system comprising:
    a flow control valve for controlling a flow to pass through a blow-by gas passage to return blow-by gas produced by an internal combustion engine to an intake passage of said internal combustion engine;
    upstream pressure detecting means arranged in said blow-by gas passage for detecting a pressure upstream of said flow control valve;
    intake pressure detecting means for detecting a pressure in said intake passage; and
    abnormality deciding means for deciding that an abnormality occurs in said blow-by gas passage, on the basis of the pressure detected by said upstream pressure detecting means and the pressure detected by said intake pressure detecting means.

14. A blow-by gas passage abnormality detecting system according to claim 13,
    wherein said abnormality deciding means includes means for deciding an abnormality by comparing a differential pressure between the pressure detected by said upstream pressure detecting means and the pressure detected by said intake pressure detecting means, with a predetermined level, and
    wherein said predetermined level is set on the basis of a differential pressure between the pressure detected by said upstream pressure detecting means and the pressure detected by said intake pressure detecting means when said blow-by gas passage is normal.

15. A blow-by gas passage abnormality detecting system comprising:
- a flow control valve for controlling a flow to pass through a blow-by gas passage to return blow-by gas produced by an internal combustion engine to an intake passage of said internal combustion engine;
- downstream pressure detecting means arranged in said blow-by gas passage for detecting a pressure downstream of said flow control valve;
- intake pressure detecting means for detecting a pressure in said intake passage;
- abnormality deciding means for deciding that an abnormality occurs in said blow-by gas passage, on the basis of the pressure detected by said downstream pressure detecting means and the pressure detected by said intake pressure detecting means; and
- control inhibition means for inhibiting a portion of controls of said internal combustion engine when it is decided by said abnormality deciding means that an abnormality occurs in said blow-by gas passage,
- wherein said control inhibition means includes means for invalidating an exhaust gas recirculation control to recirculate exhaust gas of said internal combustion engine to said intake passage.

16. A blow-by gas passage abnormality detecting system comprising:
- a flow control valve for controlling a flow to pass through a blow-by gas passage to return blow-by gas produced by an internal combustion engine to an intake passage of said internal combustion engine;
- downstream pressure detecting means arranged in said blow-by gas passage for detecting a pressure downstream of said flow control valve;
- intake pressure detecting means for detecting a pressure in said intake passage;
- abnormality deciding means for deciding that an abnormality occurs in said blow-by gas passage, on the basis of the pressure detected by said downstream pressure detecting means and the pressure detected by said intake pressure detecting means; and
- control inhibition means for inhibiting a portion of controls of said internal combustion engine when it is decided by said abnormality deciding means that an abnormality occurs in said blow-by gas passage,
- wherein said control inhibition means includes means for inhibiting a purge control to purge an evaporated gas produced in a fuel tank to said intake passage.

17. A blow-by gas passage abnormality detecting system comprising:
- a flow control valve for controlling a flow to pass through a blow-by gas passage to return blow-by gas produced by an internal combustion engine to an intake passage of said internal combustion engine;
- downstream pressure detecting means arranged in said blow-by gas passage for detecting a pressure downstream of said flow control valve;
- intake pressure detecting means for detecting a pressure in said intake passage;
- abnormality deciding means for deciding that an abnormality occurs in said blow-by gas passage, on the basis of the pressure detected by said downstream pressure detecting means and the pressure detected by said intake pressure detecting means; and
- control inhibition means for inhibiting a portion of controls of said internal combustion engine when it is decided by said abnormality deciding means that an abnormality occurs in said blow-by gas passage, wherein said control inhibition means includes means for inhibiting detection of misfire in said internal combustion engine.

18. A blow-by gas passage abnormality detecting system comprising:
- a flow control valve for controlling a flow to pass through a blow-by gas passage to return blow-by gas produced by an internal combustion engine to an intake passage of said internal combustion engine;
- downstream pressure detecting means arranged in said blow-by gas passage for detecting a pressure downstream of said flow control valve;
- intake pressure detecting means for detecting a pressure in said intake passage;
- abnormality deciding means for deciding that an abnormality occurs in said blow-by gas passage, on the basis of the pressure detected by said downstream pressure detecting means and the pressure detected by said intake pressure detecting means; and
- control inhibition means for inhibiting a portion of controls of said internal combustion engine when it is decided by said abnormality deciding means that an abnormality occurs in said blow-by gas passage, wherein said control inhibition means includes means for inhibiting a feedback control of an idle rotation speed of said internal combustion engine.

19. A blow-by gas passage abnormality detecting system comprising:
- a flow control valve for controlling a flow to pass through a blow-by gas passage to return blow-by gas produced by an internal combustion engine to an intake passage of said internal combustion engine;
- downstream pressure detecting means arranged in said blow-by gas passage for detecting a pressure downstream of said flow control valve;
- intake pressure detecting means for detecting a pressure in said intake passage;
- abnormality deciding means for deciding that an abnormality occurs in said blow-by gas passage, on the basis of the pressure detected by said downstream pressure detecting means and the pressure detected by said intake pressure detecting means; and
- control inhibition means for inhibiting a portion of controls of said internal combustion engine when it is decided by said abnormality deciding means that an abnormality occurs in said blow-by gas passage, wherein said control inhibition means includes means for inhibiting a learning control of an air/fuel ratio of an air/fuel mixture of said internal combustion engine.

* * * * *